(12) United States Patent
Detwiler et al.

(10) Patent No.: US 8,496,179 B2
(45) Date of Patent: Jul. 30, 2013

(54) METHODS AND APPARATUS FOR IMAGING BAR CODE SCANNING

(75) Inventors: Paul Oliver Detwiler, Lawrenceville, GA (US); John Peter Roquemore, Lawrenceville, GA (US)

(73) Assignee: NCR Corporation, Duluth, GA (US)

(*) Notice: Subject to any disclaimer, the term of this patent is extended or adjusted under 35 U.S.C. 154(b) by 0 days.

(21) Appl. No.: 12/570,016

(22) Filed: Sep. 30, 2009

(65) Prior Publication Data

US 2011/0073656 A1  Mar. 31, 2011

(51) Int. Cl.
*G06K 7/10* (2006.01)
(52) U.S. Cl.
USPC ...... 235/462.41; 235/435; 235/439; 235/440; 235/462.11; 235/462.22; 235/462.23; 235/462.24; 235/462.43
(58) Field of Classification Search
USPC .............. 235/435, 439, 440, 462.11, 462.22, 235/462.23, 462.24, 462.43
See application file for complete search history.

(56) References Cited

U.S. PATENT DOCUMENTS

| | | | |
|---|---|---|---|
| 6,307,208 B1* | 10/2001 | Cocuzza et al. | 235/472.01 |
| 2004/0026513 A1* | 2/2004 | Stockhammer | 235/462.43 |
| 2005/0258249 A1* | 11/2005 | Giebel et al. | 235/462.11 |
| 2007/0228176 A1* | 10/2007 | Vinogradov et al. | 235/462.46 |
| 2008/0107350 A1* | 5/2008 | Guichard et al. | 382/255 |
| 2008/0179402 A1* | 7/2008 | Barkan et al. | 235/462.41 |
| 2009/0084854 A1* | 4/2009 | Carlson et al. | 235/462.41 |
| 2009/0206158 A1* | 8/2009 | Thuries et al. | 235/454 |
| 2010/0001075 A1* | 1/2010 | Barkan | 235/462.41 |

* cited by examiner

*Primary Examiner* — Allyson Trail
(74) *Attorney, Agent, or Firm* — Peter H. Priest; Paul W. Martin (57) ABSTRACT

Improved systems and techniques for imaging bar code processing. One or more cameras are deployed in a bar code scanner, oriented so that an imaging device of each camera is oriented such that rows of data elements in the imaging device are oriented nonorthogonally with respect to a preferred orientation of a bar code. One or more imaging devices captures bar code data representing light and dark spaces of the bar code. The captured bar code data is analyzed to create one or more rows of data completely transecting the bar code, and the rows of data are processed to generate a scan signal which is in turn processed to extract bar code data.

20 Claims, 5 Drawing Sheets

METHODS AND APPARATUS FOR IMAGING BAR CODE SCANNING

FIELD OF THE INVENTION

The present invention relates generally to improved systems and techniques for bar code scanning. More particularly, the invention relates to improved systems and techniques for imaging bar code scanning including capturing data using imaging devices oriented such that the rows of data elements of the imaging device are nonorthogonal to preferred orientations for presentation of bar codes.

BACKGROUND OF THE INVENTION

With the increasing prevalence and capability of digital imaging techniques, imaging bar code scanning is gaining increasing interest as a mechanism for bar code scanning. Imaging scanning allows for significant simplification of scanner design and construction by avoiding complex laser and optical components used in conventional bar code scanners.

Conventional laser bar code scanners, particularly pass by scanners, frequently provide numerous differently oriented scan lines, so that one or more scan lines can be counted on to intersect bar codes presented in a variety of different orientations. Imaging bar code scanners, on the other hand, typically employ cameras which capture images with square or rectangular imaging devices arranged in one or more rows of data elements, or pixels, so that image information is distributed across a plurality of rows of data elements. Bar code information, that is, data indicating light and dark areas of a bar code image, appears in each of a plurality of rows across the array. Typical imaging bar code scanners often use imaging devices oriented such that the image of a bar code captured by an imaging device is orthogonal to the rows of pixels of the imaging device in a preferred orientation in which the bar code may be expected to be presented. An image captured by such a device is well adapted to processing if the lines and spaces of the bar code are orthogonal to the rows of pixels in the imaging device, but much less well adapted to processing if the lines and spaces are parallel to the rows of pixels.

SUMMARY OF THE INVENTION

The present invention recognizes that prior art capture and processing of digital bar code images leads to a strong orientation preference for bar codes. An imaging device with horizontally oriented rows will yield good results if a bar code is presented in a vertical, or picket fence, orientation but poor results if the bar code is presented in a horizontal, or ladder, orientation. An imaging device with vertically oriented rows will yield good results if a bar code is presented in a ladder orientation, but poor results if the bar code is presented in a picket fence orientation. In addition, the present invention recognizes that a wide variety of bar codes exist, including small bar codes, and including bar codes whose smallest lines and spaces are small enough that a single pixel of an imaging device might be spanned by both a dark line and a white space. In addition, the invention recognizes that prior art imaging scanners typically experience a relatively shallow depth of field because objects being scanned are presented at a short distance from the imaging device, and a relatively wide camera aperture must be used to avoid a need for excessively bright illumination, which could result in operator discomfort.

The present invention addresses such concerns, as well as others, by providing for a scanner employing one or more imaging devices oriented such that at least one imaging device will not be oriented such that its rows are parallel to a bar code. For example, in one aspect of the invention, two cameras are used. The cameras are oriented such that their imaging devices are orthogonal to one another. Such an orientation may be accomplished, for example, by orienting a first camera horizontally with respect to a scan window and a second camera vertically with respect to the scan window.

However, it is also possible to use one or more cameras in orientations that are not orthogonal to the bar codes, and such orientations may provide significant advantages. Positioning a bar code at a nonorthogonal angle to an imaging device to be used for image capture can provide for an effective magnification of the bar code. Therefore, one suitable configuration for an imaging scanner is to orient one or more cameras such that the rows of the imaging device of each camera are oriented at an angle other than a right angle to the scan window. For example, a first camera can be oriented so that the imaging device is at +45° or −45° with respect to the scan window. If an additional camera is used, it can be oriented so that the imaging device is arranged in an opposite orientation to the first imaging device. For example, a first imaging device may be oriented at +45° and a second imaging device may be oriented at −45° with respect to the scan window. Such an orientation provides an effective magnification of a bar code presented vertically or horizontally, as described further below.

In addition, the use of multiple cameras can be used to provide a greater depth of field for a scanner than can the use of a single camera. Therefore, in one embodiment, a scanner according to an aspect of the present invention employs multiple cameras at staggered object distances. In another embodiment, one or both cameras employs a rapid focus lens. Images taken from multiple cameras are used to determine a distance to the bar code and the knowledge of this distance is used to focus the lens.

A more complete understanding of the present invention, as well as further features and advantages of the invention, will be apparent from the following Detailed Description and the accompanying drawings.

DETAILED DESCRIPTION

Figure 1:
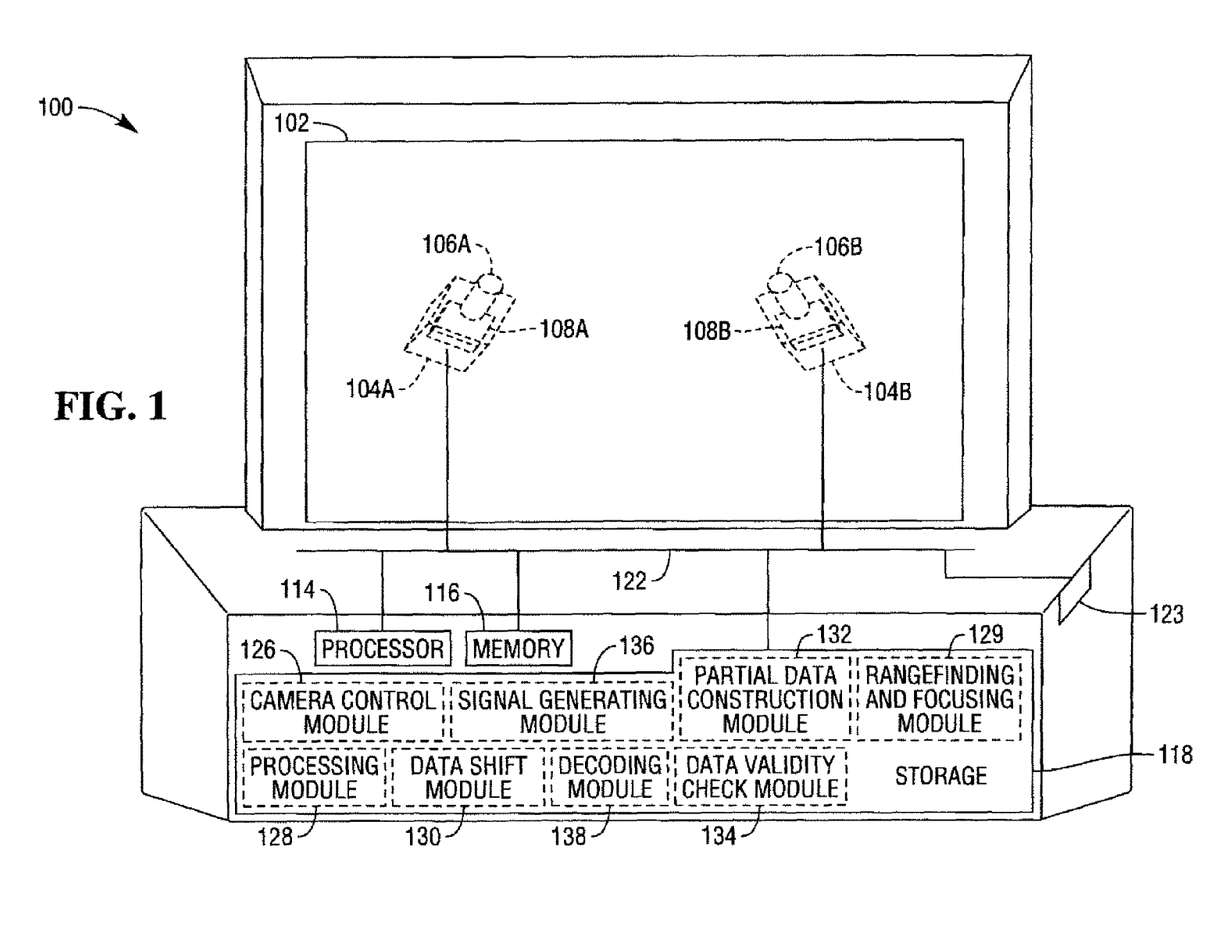
FIG. 1 illustrates a scanner according to an aspect of the present invention.

FIG. 1 illustrates a bar code scanner 100 according to an aspect of the present invention. The components of the scanner 100 are shown in block diagram form. The scanner 100 includes a vertical scan window 102 and first and second cameras 104A and 104B. While a vertical scan window is shown here as illustrative, a horizontal scan window may be employed as an alternative or in addition to the horizontal scan window 102.

The cameras 104A and 104B are digital cameras including lenses 106A and 106B, and imaging devices 108A and 108B, respectively. The cameras 104A and 104E are oriented such that the imaging devices are at an angle to a preferred orientation for a bar code presented at the scan window 102. A bar code in its preferred orientation of presentation will be presented in either a horizontal or vertical orientation, so the camera 104A is oriented at an angle of +45° from horizontal, and the camera 104B is oriented at an angle of −45° from horizontal. These orientations insure that bar codes held in either preferred orientation will intersect rows of pixels of each of the imaging devices 108A and 108B, and provides additional advantages discussed in greater detail below.

The scanner 100 further includes a processor 114, memory 116, long term storage such as flash memory 118, communicating with one another and with the cameras 104A and 104B over a bus 122. The scanner also includes a scanner interface 123, for communicating with a checkout terminal or other suitable device.

When a bar code is presented at the scan window 102, an image of the bar code is captured by each of the imaging devices 108A and 108B. The images may be transferred to memory 116 for analysis. The images will be in the form of light and dark areas, with each image comprising data spanning rows of pixels. Each row of pixels will include stored data representing light and dark areas of the bar code, and this stored data can be processed to generate a scan signal. Typically, multiple rows of pixels will be selected, and the stored data for the selected rows will be processed so as to combine or examine data from multiple rows. Such combination and examination may be performed so as to reduce noise by averaging data from multiple rows, for combining data representing portions of the bar code, for taking advantage of phase shifting between rows, and to achieve other desired functions.

The scanner 100 employs a camera control module 126 and a processing module 128, residing in the storage 118 and transferred to memory 116 as needed for execution by the processor 114. The camera control module 126 monitors the images being received by each of the imaging devices 108A and 108B, and the conditions affecting the cameras 104A and 104B, and directs appropriate actions by the cameras 104A and 104B, such as focusing and image capture. The camera control module 126 employs a rangefinding and focusing module 129, used to determine the distance from one or both of the cameras 104A and 104B to a bar code and to focus one or both of the lenses 106A and 106B based on the distance determination.

The processing module 128 employs a data shift module 130, used to offset data captured by one or both of the imaging devices 108A and 108B so as to select rows of data which may not necessarily be captured in rows of pixels. Instead, for some relative orientations of a camera and a bar code, rows of data may span multiple rows of pixels.

When an image has been captured by one or both of the imaging devices 108A and 108B, the processing module 128 analyzes the image to identify a bar code appearing in the image, and selects rows of pixels storing data intersecting the bar code. Data from the pixels is combined as needed to produce one or more rows of data fully transecting the bar code. The rows of data transecting the bar code are processed to generate a scan signal, and the scan signal is decoded to extract bar code information. The processing module 128 employs a partial data construction module 132, and a data validity check module 134. The processing module 128 also includes a bar code signal generating module 136.

Figure 2:
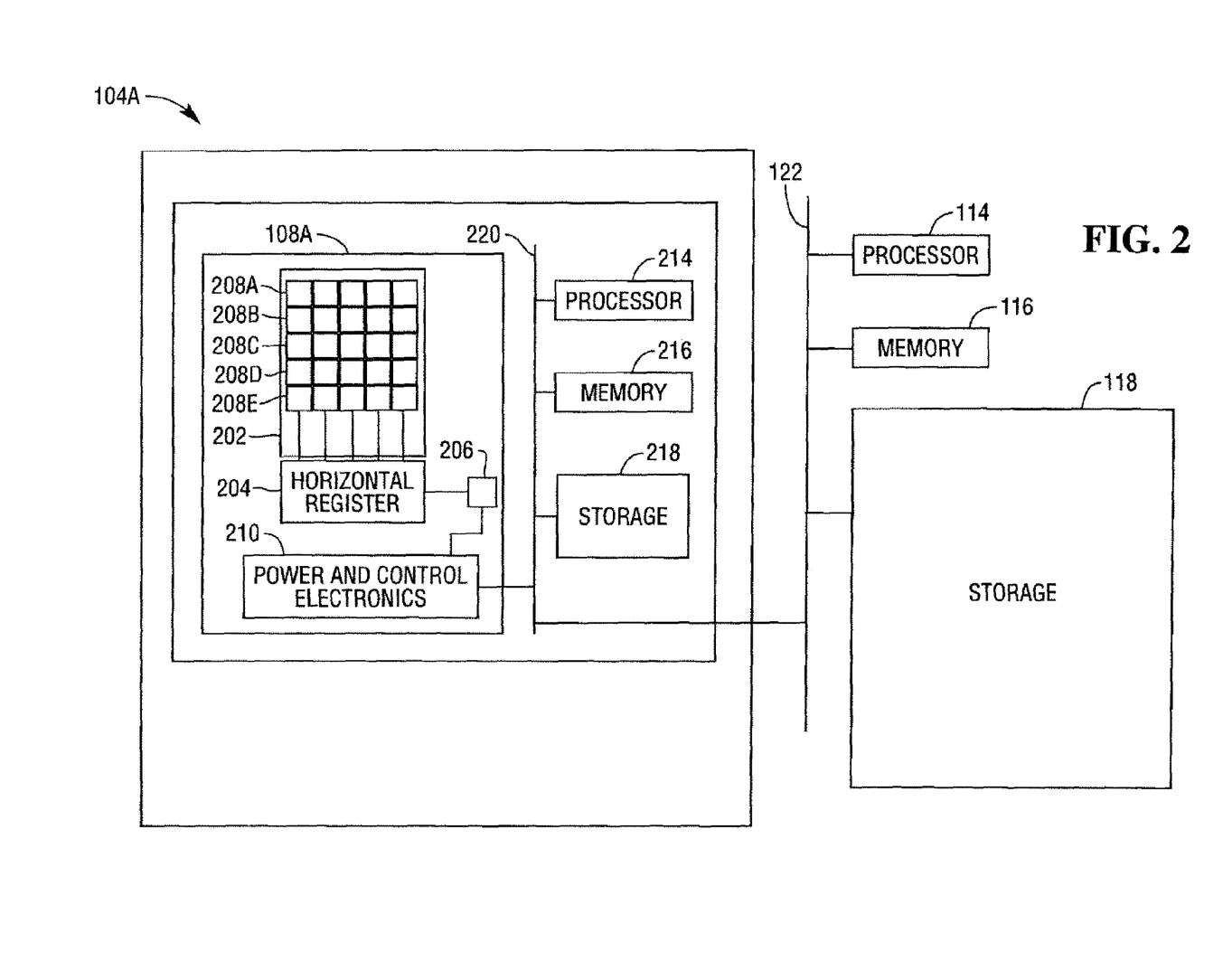
FIG. 2 illustrates details of a camera used in a scanner according to an aspect of the present invention.

FIG. 2 illustrates further details of the camera 104A. The camera 104E is not illustrated here, in order to avoid repetitive description, but may suitably operate in a way similar to that of the camera 104A discussed below.

The camera 104A includes the imaging device 108A, which may take the form of a charge coupled device (CCD), CMOS sensor device, or other suitable device. The imaging device 108A comprises an array 202 of individual pixels, a horizontal register 204, and a bus 206. The array may comprise millions of pixels, each on the order of microns or tens of microns in width and height, but for simplicity, only a sample of 25 pixels arranged in rows 208A-208E are illustrated here. The imaging device 108A also suitably includes a power and electronics control package 210. These elements may all reside on a single chip. When light strikes the imaging device 108A, charges accumulate in the cells of the array 202. In order to retrieve visual information from the array 202, charges are allowed or induced to migrate vertically to the horizontal register 204, and then to the bus 206. The camera 104A further comprises a processor 214, memory 216, and storage 218, as well as a camera bus 220. The camera bus 220 provides communication with the bus 122 of the scanner 100. The processor 114, memory 116, and storage 118 are also illustrated here, communicating with the camera 104A over the bus 122.

Figure 3A:
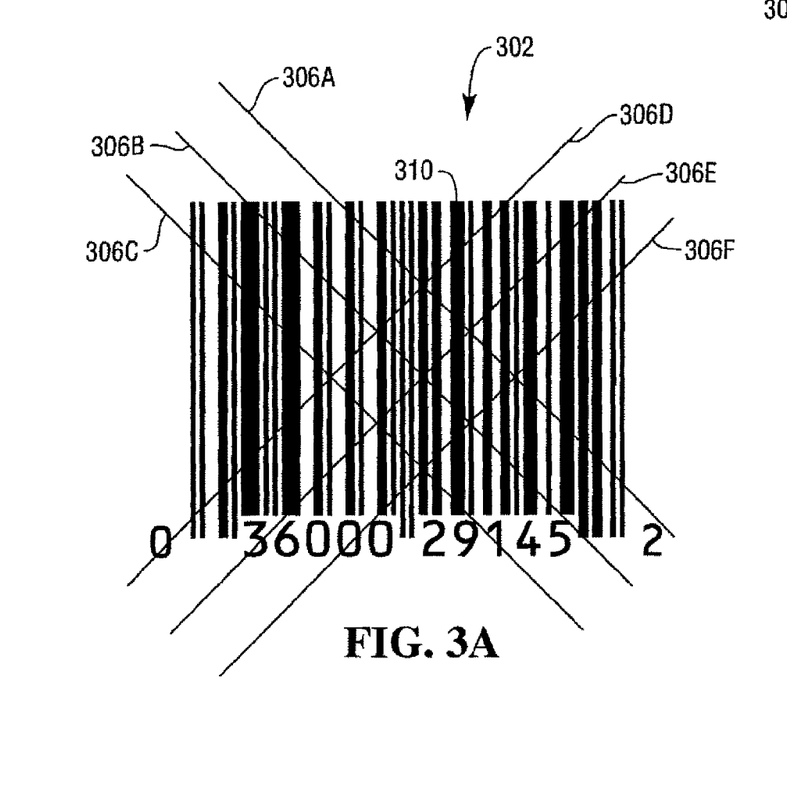
FIGS. 3A-3D illustrate bar codes and rows of data taken from the bar codes according to an aspect of the present invention.
Figure 3B:
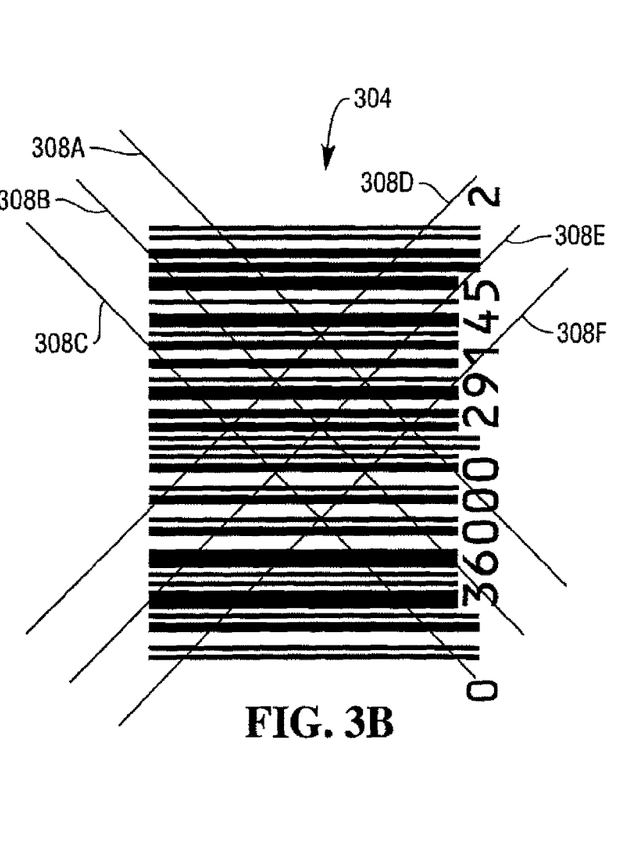

FIGS. 3A and 3B illustrate horizontally and vertically presented bar codes superimposed with data captured by the cameras 104A and 104B. More particularly, FIG. 3A illustrates a bar code 302 presented horizontally with respect to a scan window such as the scan window 102, and FIG. 3B illustrates a bar code 304 presented vertically with respect to the scan window. Lines 306A-306C of FIG. 3A illustrate rows of data captured by the camera 104A, with the imaging device 108A at an angle of +45° with respect to the bar code 302, and lines 306D-306F of FIG. 3A illustrate rows of data captured by the camera 104B, with the imaging device 108B at an angle of −45° with respect to the bar code 302. Lines 308A-308C of FIG. 3B illustrate rows of data captured by the camera 104A, with the imaging device 108A at an angle of +45° with respect to the bar code 304, and lines 308D-308F of FIG. 3B illustrate rows of data captured by the camera 10413, with the imaging device 108B at an angle of −45° with respect to the bar code 304. It can be seen that all of the rows of data captured by the imaging devices 108A and 108B transect all or parts of the bar codes 302 and 304, generating substantial bar code data, even though none of the rows of data are orthogonal to the bar codes 302 and 304, as the rows of data transect the bar codes diagonally. In addition, the light and dark intervals transected by the diagonal rows of data are of the same relative width as intervals transected by vertical rows of cells aligning with the bars and spaces of a horizontally presented bar code (a picket fence) as in FIG. 3A, or horizontal rows of cells aligning with the bars and spaces of a vertically presented bar code (a ladder) as in FIG. 3B, while providing an effective magnification of the intervals, as described in further detail below. Because the orientation of each of the imaging devices 108A and 108B is intermediate between horizontal and vertical, the scanner 100 does not exhibit the strong orientation preference, along with preferential presentation, of prior art vertical and horizontal imaging scanners, and can relatively easily process both ladder and picket fence tags. It will be recognized that in many cases a single camera can process both a ladder and a picket fence bar code, and the use of two cameras provides additional data for processing.

For example, consider, lines 306A-306C of FIG. 3A and rows 308A-308C of FIG. 3B. The bar codes 302 and 304 are differently oriented, but each bar code is transected by the rows of data captured by a single camera, and a combination of the data rows from each camera can be selected to provide data completely transecting the bar code utilizing bar code stitching in a known manner. For example, the row 306A of FIG. 3A includes data from the right edge of the bar code, and the row 306C of FIG. 3C includes data from the left edge of the bar code. If two cameras oriented at plus and minus 45°, respectively, are employed, data from corresponding rows of pixels of each camera can be taken to provide data completely transecting the bar code. For example, consider lines 306A and 306D of FIG. 3A. Line 306A is taken from one row of pixels of camera 104A and line 306D is taken from the corresponding row of pixels of camera 104B. Between them, the lines 306A and 306D completely transect the bar code 302 and if the data represented by the lines 306A and 306D is stitched together, a complete transection of the bar code 302 is achieved.

In addition to reducing the orientation preference exhibited by prior art imaging scanners, the orientation of the cameras 104A and 104B so that they are not orthogonal to the typical preferred presentation orientations of bar codes provides additional advantages. If the rows of pixels of an imaging device are oriented at an angle with respect to the lines and spaces of the bar code, an effective magnification is achieved. As the angle moves away from a 90 degree angle, the effective width of the light and dark areas is effectively magnified by a factor of $$\frac{1}{\sin(\alpha)},$$

where α is the angle. Thus at an angle of 45°, the effective magnification is a factor of 1.4. This phenomenon is made clear by an examination of the geometry of the orthogonal versus angled transection of the bar code. For example, consider the transection of the dark area 210 by the line 306A. The line 306A transects the dark area 310 diagonally, and traverses the space 310 over a greater distance than would a horizontal line.

Figure 3C:
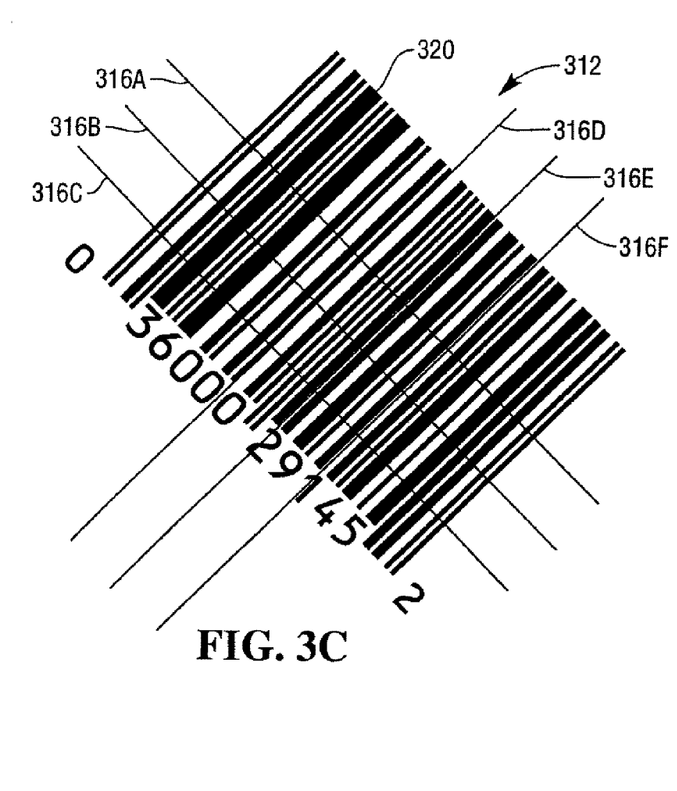
Figure 3D:
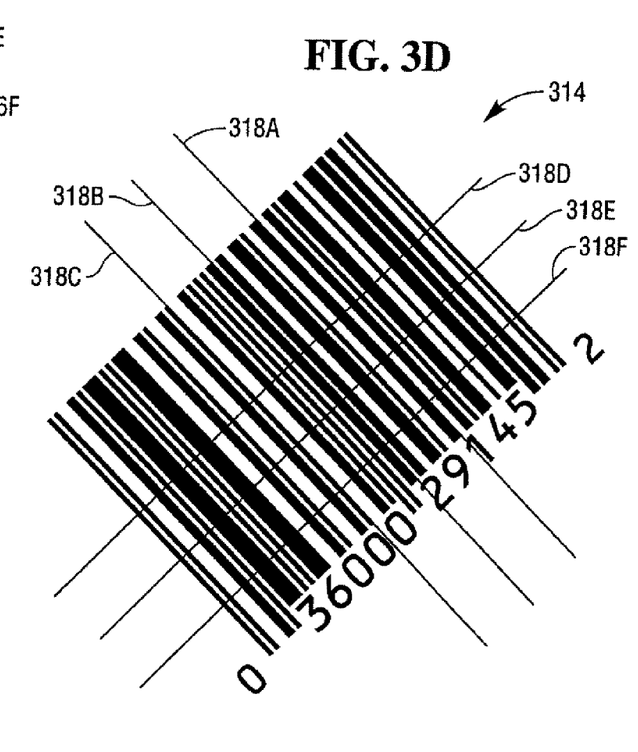

FIGS. 3C and 3D illustrate bar code images 312 and 314, taken from bar codes presented at different orientations compared to the images 302 and 304. In the orientation of the bar code image 312, the light and dark spaces are orthogonal to the lines 316A-316C and parallel to the lines 316D-316F. Similarly, in the orientation of the bar code image 314, the light and dark spaces are parallel to the lines 318A-318C and orthogonal to the lines 318D-318F. It can be seen that the use of separate, differently oriented cameras provides for an increased flexibility in the orientation of bar codes. In the examples of FIGS. 3C and 3D, each bar code is at an unfavorable orientation for one of the cameras, but because two separate cameras oriented orthogonally to one another are used, a bar code at an unfavorable location for one camera is at a highly favorable orientation for the other camera. The use of two cameras thus allows for substantial variation in the orientation at which bar codes are presented. One camera or the other is highly likely to be at a satisfactory orientation with respect to a bar code.

The nonorthogonal orientation of the cameras 104A and 104B provides additional advantages. A nonorthogonal orientation of pixel rows with respect to a bar code results in the capture of different data for each pixel row. Compare FIGS. 3A and 3C. In FIG. 3C, the lines 316A and 316B cross the dark area 320, at equivalent points on the lines 316A and 316B. The image data for the dark area 320 is stored at corresponding pixels for each pixel row capturing data representing the lines 316A and 316B, and the lines 316A and 316B represent captures of similar or identical data at identical points along their extent.

In FIG. 3A, the lines 306A and 306B cross the dark area 310 at different points along the lines, so that data representing the dark area 310 is stored at pixels at different horizontal positions along the rows of pixels capturing data representing the rows 306A and 306B.

The present invention takes advantage of this phenomenon in a number of ways. Many very small bar codes are now in use, with the width of the light and dark spaces of such small bar codes approaching the width of a pixel of an imaging device. If a pixel is overlapped by portions of a light and dark space, the pixel will capture the data as gray, and the presence of such invalid data may render a bar code unreadable. If an imaging device is orthogonal to a bar code, each row will capture similar or identical data and each row will be subject to the same problems. If a nonorthogonal orientation is used, however, such as is illustrated in FIG. 3A, each row of pixels will capture different data, with the rows exhibiting a shift of data with respect to one another. If one row captures data in which pixels overlap adjacent light and dark spaces, it is highly likely that other rows can be found in which this phenomenon is not present. With suitable data processing, the overlap can be filtered out and the accurate data employed.

Returning to FIG. 1, the processing module 128 operates to analyze data captured by one or both of the cameras 104A and 104B in order to construct data completely representing the light and dark spaces of a bar code. The processing module 128 employs the partial data construction module 132 to join data from rows of pixels partially transecting a bar code in order to form a line of data representing a complete transection of the bar code. The partial data construction module 132 recognizes indicia indicating the beginning and end of a bar code and selects from one row of pixels data including the beginning of a bar code. The partial data construction module 132 then selects from a different row of pixels data including the end of the bar code. The partial data construction module 132 then joins the data from the two rows, with joining being accomplished by identifying portions of row of pixels in which data overlaps with data from the other row of pixels. One convenient mechanism that the partial data construction module 132 may employ is to select data from corresponding rows of pixels from the camera 104A and the camera 104B, because in many cases such data can be expected to combine to yield data completely transecting the bar code.

The processing module 128 further employs the data validity check module 134. The data validity check module 134 examines pixels for a selected row to determine if more than a predetermined number of pixels are storing invalid data, such as gray resulting from an overlap of the pixel onto a dark and light space. If more than the predetermined number of pixels is found, the data validity check module 134 directs the processing module 128 to reject the row, and another row is selected and analyzed.

Once appropriate rows of pixels have been selected and the data stored in these rows of pixels has been analyzed and joined, if needed, one or more rows of data are passed to the signal generating module 136. The signal generating module 136 analyzes the light and dark spaces of the rows of data to generate a scan signal, and the decoding module 138 processes the scan signal to extract bar code information. The bar code information is then passed to the scanner interface 123 for use by a checkout terminal or other device with which the scanner 100 is used.

In addition to analyzing data by examining data captured by rows of pixels, increased versatility can be achieved by allowing for shifts of data, so that data can be selected from multiple rows of pixels to make up a row of data transecting a bar code. For example, the line 306A of FIG. 3A need not necessarily be taken from a row of adjacent pixels. The array 202 of FIG. 2 is a two dimensional array, and an image of a bar code may be captured by the image 202 in any of a number of different orientations. For example, if the bar code 302 is orthogonal to an imaging device, the pixels of the imaging device will capture rows of data that orthogonally transect the bar code. However, it is possible to select pixels that are not oriented orthogonally to the bar code. For example, a row of data transecting a bar code diagonally may be constructed by selecting pixels that are diagonally arranged across an array of an imaging device. The processing module 128 may therefore employ the data shift module 129 to apply predetermined data shifts to captured images, in order to provide for additional perspectives for examining the data. Rows of data constructed using such data shifts are combined and processed as needed to provide bar code information.

The use of multiple cameras provides for the ability to capture more rows of data from a different perspective than can be captured by a single camera, and provides for greater simplicity and assurance in capturing data suitable for decoding. In addition to providing these advantages, the use of separate cameras provides mechanisms for increasing the depth of field of scanners such as the scanner 100. For example, the cameras 104A and 104E may be configured so that they provide staggered depth of field, with the first camera providing acceptable focus at greater distances and the second camera providing acceptable focus at lesser distances. Such differences in depth of field may be provided by choosing cameras set at different focal points. For example, if both the camera 104A and the camera 104B employ fixed focus lenses with a focal length of 6 mm, different focusing points may be achieved by placing the imaging devices 108A and 108B at different distances behind the lenses 106A and 106B, respectively. For example, in order to achieve an object distance of 150 mm for the camera 104A, the imaging device 108A would be placed 6.25 mm behind the lens 106A, and to achieve an object distance of 125 mm for the camera 104B, the imaging device 108B would be placed 6.302 mm behind the lens 106B.

The depth of field is based on the size of an acceptable blur point. A point object at the focusing distance of a camera will produce a point image, and an object in front of or behind this focusing distance will produce a blur spot, with the blur spot increasing in diameter as the distance of the object diverges more and more from the focusing distance. The depth of field is a range bounded by the minimum and maximum distances at which the blur spot diameters are acceptably small. In imaging bar code scanning, the acceptable blur spot size is determined by the size of the minimum module, that is, the minimum light or dark bar code area, in a bar code to be decoded, and the pixel size of the imaging device being used.

For example, a barcode may have a minimum module width of 6 mils, or 150 um. An exemplary pixel width might be 6 um. If a module is to span a pixel, the magnification m provided by the focusing of the lens would be m=(−) 6/150 which is a function of the image and object distances by: m=−s'/s, where s is the object distance and s' is the distance from the lens to the imaging device. For a blur spot of c=3 um, equivalent to ½ pixel, and an object distance of 150 mm, a depth of field would be approximately 14 mm. For such a case, therefore, an improved depth of field could be provided by configuring the cameras 104A and 104B so that the camera 104A was focused at an object distance of 157 mm and the camera 104E was focused at an object distance of 143 mm. Both cameras will provide acceptable focus for an object at a distance of 150 mm, and one camera or the other will provide acceptable focus at all distances between 136 min and 164 mm.

Alternatively or in addition, cameras such as the cameras 104A and 104B can be used to allow for binocular rangefinding in order to determine a distance to a bar code. Knowledge of the distance can then be used to adjust a lens such as a rapid focus lens used by one or both of the cameras 104A and 104B. When both cameras capture an image of an object, the position of the image will experience a relative shift between the cameras based on the distance between the cameras and the distance between the cameras and the object. The camera control module 126 therefore invokes the rangefinding and focusing module 130 to identify a feature of an image appearing in each camera and to evaluate the images to determine the offset between the feature from image to image. The position of the feature on the imaging device of each camera is determined, and the angle from the feature its image in the imaging device is determined for each camera. The angles and the known distance between cameras are used to determine the distance from each camera to the feature. The rangefinding and focusing module 130 then uses the range to focus one or both of the lenses 106A and 106B. The camera control module 126 then directs one or both of the cameras 104A and 104B to capture and store an image, and the image is then processed by the processing module 128.

Figure 4:
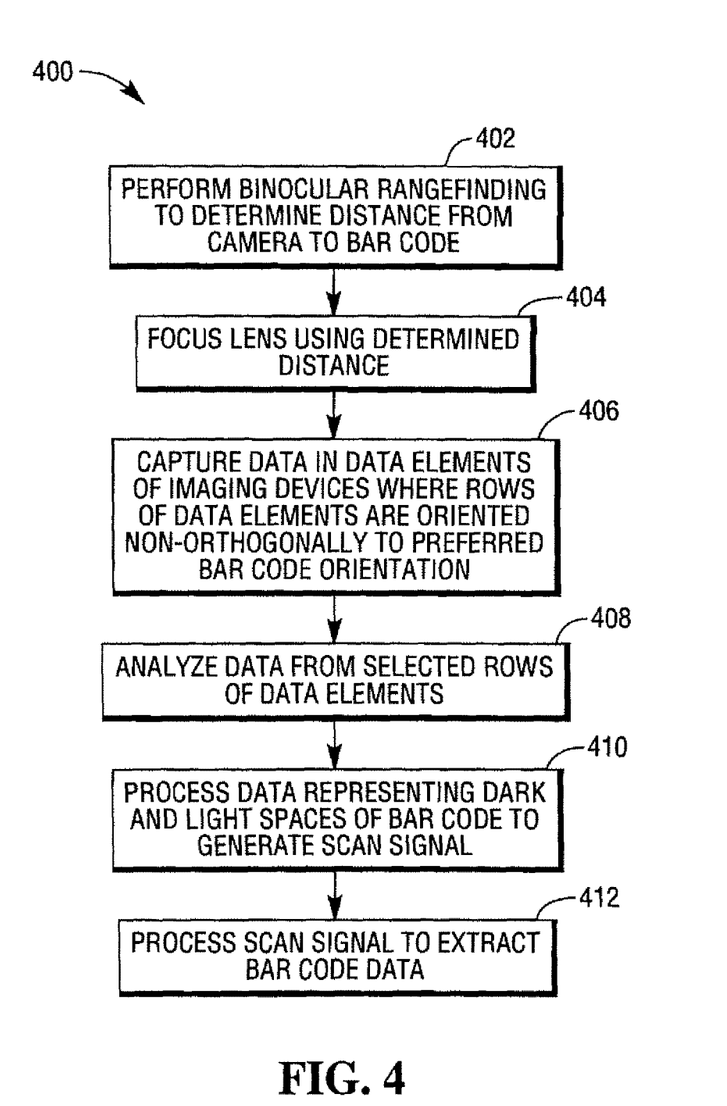
FIG. 4 illustrates a process of imaging bar code processing according to an aspect of the present invention.

FIG. 4 illustrates the steps of a process 400 of image bar code processing according to an aspect of the present invention. The process 400 may be carried out using a scanner such as the scanner 100 illustrated in FIGS. 1 and 2 and discussed above. At step 402, upon presentation of a bar code at a scan window of a scanner, binocular rangefinding is carried out by dual cameras within the scanner to determine a distance between the bar code and imaging devices of one or both of the cameras. At step 404, the distance information is used to focus one or more variable focus lenses. At step 406, image data representing the bar code is stored in the imaging devices, with the data being stored in rows of data elements arranged in arrays in the imaging devices. The imaging devices are preferably oriented such that they are nonorthogonal to preferred presentations of a bar code. Advantageous orientations that may be used include +45° or −45° if a single camera is used, or if two cameras are used, +45° for one camera and −45° for the other camera. While in the examples discussed, one or two cameras are employed, it will be recognized that additional cameras may be used if such an addition is cost effective.

At step 408, data from selected data elements is analyzed. The selected data elements may suitably be selected rows of data elements. Analysis may include the combining of data to produce rows of data completely transecting the bar code, and may be accomplished, for example, by examining and combining data from multiple rows of pixels from one imaging device, or by examining and combining corresponding rows of pixels from two imaging devices. Analysis may further include examining rows of pixels for valid data and if excessive invalid data is found, selecting alternative rows.

Alternatively, data elements may be selected across rows. Depending on the relative orientation of a bar code and an imaging device, desirable sequences of bar code data may span multiple rows. For example, a bar code may be presented orthogonally to the imaging device and it may be desired to capture a row of data transecting the bar code diagonally. Selection of data elements may therefore include examining sequences of data elements in multiple directions and selecting sequences that provide for efficient processing. At step 410, one or more rows of data representing dark and light spaces across a complete transection of the bar code are processed to generate a scan signal, and at step 412, the scan signal is processed to extract bar code data.

While the present invention is disclosed in the context of a presently preferred embodiment, it will be recognized that a wide variety of implementations may be employed by persons of ordinary skill in the art consistent with the above discussion and the claims which follow below.

We claim:

1. An imaging bar code scanner comprising:
a scanning aperture;
at least two digital cameras for capturing images of a barcode through the scanning aperture, each comprising an imaging device facing in a nonorthogonal direction towards the scanning aperture;
the imaging device for each of the at least two cameras comprising an array of pixels arranged in a plurality of rows of pixels and capturing data representing image elements of the bar code presented to the scanning aperture for scanning; and
said at least two cameras being oriented such that the rows of pixels of a first camera are angled with respect to the rows of pixels of a second camera and are both nonorthogonal and transverse to the scanning aperture and to a preferred orientation for the bar code presented for scanning.

2. The bar code scanner of claim 1, wherein each imaging device is operative to capture a plurality of rows of data representing dark and light spaces of the bar code, and wherein the scanner further comprises a processor for combining two or more rows of data to provide a complete transection of the bar code.

3. The bar code scanner of claim 1, wherein the at least two cameras comprise first and second cameras angled at opposing angles with respect to the scanning aperture and to the preferred orientation for the bar code.

4. The bar code scanner of claim 1, wherein at least one of the cameras is oriented such that the imaging device is at an angle of +45 degrees from orthogonal to the scanning aperture and to the preferred orientation for the bar code.

5. The bar code scanner of claim 1, wherein the at least two cameras comprise first and second cameras, and wherein the first camera is oriented such that the imaging device of the first camera is at an angle of +45 degrees from orthogonal to the scanning aperture and to a preferred orientation for the bar code and the imaging device of the second camera is at an angle of −45 degrees from orthogonal to the aperture and to the preferred orientation for the bar code.

6. The bar code scanner of claim 5, wherein each imaging device is operative to capture a plurality of rows of data representing dark and light spaces of the bar code, and wherein the scanner further comprises a processor for combining one or more rows of data to provide a complete transection of the bar code, combining the one or more rows of data comprising combining corresponding rows of data from each of the imaging devices.

7. The bar code scanner of claim 1, wherein the at least two cameras comprise first and second cameras focused at different distances so that the cameras provide overlapping depths of field.

8. The bar code scanner of claim 7, wherein the distances are determined by taking into account a size of a minimum element to be captured by one of the pixels of the array with respect to a size of the one pixel of the array and a size of a maximum acceptable blur spot with respect to the size of the one pixel of the array.

9. The bar code scanner of claim 1, wherein the at least two cameras comprise first and second cameras and wherein at least one of the cameras comprises a rapid focus lens, the bar code scanner further comprising a processor operative to perform binocular range finding using the first and second cameras to determine a distance from the at least one of the cameras to the bar code and to adjust the rapid focus lens based on the determined distance.

10. The bar code scanner of claim 1, further comprising a processor for analyzing bar code data captured by the imaging devices, and wherein the processor selects data from the pixels to create one or more rows of data representing one or more transections of the bar code, selection of data comprising applying predetermined shifts to captured data to select different pixels from different rows to create final rows of data captured from multiple rows of the pixels.

11. A method of imaging bar code scanning, comprising:
capturing images of a barcode through a scanning aperture of a barcode scanner by at least two digital cameras including imaging devices facing in nonorthogonal directions towards the scanning aperture, including storing data representing light and dark elements of the bar code in each of a plurality of data elements arranged in an array or rows of data elements in each of the imaging devices of the at least two digital cameras, the at least two digital cameras being oriented such that the rows of data elements are oriented both nonorthogonally and transverse to the scanning aperture and to a preferred orientation for the bar code;
processing the stored data to generate a scan signal; and
processing the scan signal to extract bar code data.

12. The method of claim 11, wherein processing the stored data comprises combining data from multiple rows of data elements to provide a complete transection of the bar code.

13. The method of claim 12, wherein processing the stored data comprises examining rows of captured data to determine if more than a predetermined number of pixels is storing invalid data and rejecting rows of captured data including more than the predetermined number of pixels storing invalid data.

14. The method of claim 11, wherein the at least two cameras comprise first and second cameras oriented such that the rows of data elements of the first camera is oppositely oriented to the rows of data elements of the second camera.

15. The method of claim 12, wherein a first camera is oriented at an angle of +45 degrees from orthogonal to the scanning aperture and to a preferred orientation for the bar code and a second camera is oriented at an angle of −45 degrees to the scanning aperture and from the bar code.

16. The method of claim 11, further comprising the steps of:
performing binocular range finding using first and second cameras to determine a range from one of the cameras to the bar code; and
focusing a rapid focus lens of the one of the cameras based on the determined distance.

17. An imaging bar code scanner comprising:
a scanning aperture;
one or more digital cameras for capturing images of a barcode through the scanning aperture, each comprising an imaging device facing in a nonorthogonal direction towards the scanning aperture;
the imaging device for each of the one or more cameras comprising an array of pixels arranged in a plurality of rows of pixels and capturing data representing image elements of the bar code presented for scanning; and a processor for selecting data from the pixels to create one or more rows of data representing one or more transections of the bar code, selection of data including applying predetermined shifts to captured data to select different pixels from different rows to create final diagonal rows of data independently of the rows of pixels in which the captured data appears, wherein the diagonal rows of data are both transverse and nonorthogonal to the scanning aperture and to the orientation of the bar code.

18. The imaging bar code scanner of claim 17 wherein diagonal rows of data are combined and processed to provide bar code information.

19. The imaging bar code scanner of claim 18 employing two digital cameras.

20. The imaging bar code scanner of claim 19 wherein the two digital cameras provide a staggered depth of field.

* * * * *